US008514277B2

(12) United States Patent
Dyer (10) Patent No.: US 8,514,277 B2
(45) Date of Patent: Aug. 20, 2013

(54) VIDEO INFRARED RETINAL IMAGE SCANNER

(75) Inventor: David S. Dyer, Olathe, KS (US)

(73) Assignee: Dyer Holdings, LLC, Olathe, KS (US)

( * ) Notice: Subject to any disclaimer, the term of this patent is extended or adjusted under 35 U.S.C. 154(b) by 411 days.

(21) Appl. No.: 12/612,547

(22) Filed: Nov. 4, 2009

(65) Prior Publication Data

US 2010/0128117 A1 May 27, 2010

Related U.S. Application Data

(60) Provisional application No. 61/111,506, filed on Nov. 5, 2008.

(51) Int. Cl.
*H04N 9/47* (2006.01)
*H04N 7/18* (2006.01)

(52) U.S. Cl.
USPC .............................................. 348/78; 348/77

(58) Field of Classification Search
USPC ................................................ 348/78, 71, 61
See application file for complete search history.

(56) References Cited

U.S. PATENT DOCUMENTS 3,915,564 A * 10/1975 Urban ........................... 351/206
5,224,173 A    6/1993 Kuhns et al.
5,766,016 A * 6/1998 Sinclair et al. ................ 434/262
5,838,422 A   11/1998 Caskey
6,477,394 B2 11/2002 Rice et al.
6,916,096 B2  7/2005 Eberl et al.
7,448,753 B1 11/2008 Chinnock
2003/0193314 A1 10/2003 Solingen
2004/0233038 A1 11/2004 Beenau et al.

OTHER PUBLICATIONS

International Search Report dated Dec. 29, 2009 in corresponding PCT Patent Application No. PCT/US09/063413.

* cited by examiner

*Primary Examiner* — John B. Walsh
(74) *Attorney, Agent, or Firm* — Lathrop & Gage LLP (57) ABSTRACT

A method of scanning a retinal image includes providing a light source, emitting radiation from the light source toward a beam splitter, focusing the radiation with a focusing lens on a retina, collecting radiation reflected by the retina with a camera, producing an image signal representative of a plurality of images of the retina based on the collected radiation, selecting one of the plurality of images of the retina for display from the image signal, displaying the selected image of the retina on a display, comparing the selected image of the retina to at least one of a plurality of images of retinas stored in a database, selecting one of the plurality of images of retinas stored in the database that matches the selected image of the retina, and displaying the one of the matching image of the retina on the display along with the selected image of the retina.

8 Claims, 5 Drawing Sheets

VIDEO INFRARED RETINAL IMAGE SCANNER

CROSS-REFERENCE TO RELATED APPLICATIONS

This application is based upon and claims the benefit of priority to U.S. Application No. 61/111,506; filed on Nov. 5, 2008, the entire contents of which are incorporated by reference herein.

BACKGROUND

1. Field

A video infrared retinal image scanner uses an infrared light to illuminate an ocular system and a camera to capture and display an image. The image may be analyzed and processed and rendered in 3-D. Computer analysis of the retinal vessels is performed by looking at the branching pattern of the retinal vessels. An overlay of the retinal vessels may be compared to previous scans to identify a person.

2. Description of the Related Art

The patterns of branching of the retinal vessels in an eye are unique and can be used as a form of identification. Biometric identification systems involve the use of finger prints, retinal blood vessel patterns, voice dynamics, hand geometry, facial recognition, and hand writing dynamics for identification of an individual.

These vessels can be recorded using a retinal scan of the retinal vessels. The retinal scan can be used to overlay the vessels pattern over a preexisting image to match the images. The retinal vessel branching pattern can also be analyzed by computer software to compare to the branching pattern of a previous image for identification. An accurate identification can be obtained by comparing this image to a database of retinal scans.

Biometric accuracy is measured in two ways, the rate of false acceptance (an impostor is accepted as a match—Type 1 error) and the rate of false rejects (a legitimate match is denied—Type 2 error). Every biometric technique has a different method of assigning a "score" to the biometric match; a "threshold value" is defined which determines when a match is declared. Scores above the threshold value are designated as a "Hit" and scores below the threshold are designated as "No-Hit."

A Type 2 error occurs if a true match does not generate a score above the threshold. A Type 1 error is made when an impostor generates a match score above the threshold. If the Type 1 and Type 2 error rates are plotted as a function of threshold value, they will form curves which intersect at a given threshold value. The point of intersection (where Type 1 error equals Type 2 error) is called the crossover accuracy of the system. In general, as the value of the crossover accuracy increases the inherent accuracy of the biometric increases. The crossover accuracies of various means of identification are shown in Table I.

TABLE I

| Biometric | Crossover Accuracy |
|---|---|
| Retinal Scan | 1:10,000,000+ |
| Retina Scan | 1:131,000 |
| Fingerprints | 1:500 |
| Hand Geometry | 1:500 (against a very small background database) |
| Signature Dynamics | 1:50 |
| Voice Dynamics | 1:50 |
| Facial Recognition | no data |
| Vascular Patterns | no data |

Despite a high cross over accuracy, retinal scans are not without problems obtaining a good image.

There are sources of problems that could affect the performance of the retinal scanning device from obtaining an accurate scan (as is the case with any other biometric technology), thus impacting its ability to successfully verify or identify users. Among the problems are:

The lack of cooperation on part of the user. The user must remain very still in the entire process, especially in the image acquisition phase. Any movement can seriously affect the alignment of the lens in the retinal scanning device.

A dirty lens on the retinal scanning device. This will obviously interfere with the scanning process.

Other types of light interference from the external environment.

The pupil size of the user. A small pupil that is constricted to a further, smaller size because of a bright lighting environment can reduce the amount of light that reaches the retina via the pupil and vice versa. This can cause the system to have a higher rate of False Rejection.

SUMMARY

In one aspect, a retinal image scanner includes an infrared light source, a beam splitter reflecting infrared radiation from the light source through one of a plurality of focusing lenses to a retina, a camera collecting radiation reflected by the retina through the beam splitter, an analog to digital convertor receiving a raw signal from the camera based on the collected radiation, the analog to digital convertor converting the raw signal to a digital signal, a streaming video converter processing the digital signal into a video signal, and a video monitor displaying an image of the retina based on the video signal, the retinal image scanner further comprising a video transmitter, the video transmitter transmitting the video signal to a computer over a network, the computer extracting a plurality of images from the video signal, a comparator comparing at least one of the plurality of images with at least one of a plurality of stored images, and a selector selecting one of the plurality of stored images that matches the one of the plurality of images.

In another aspect, a method of scanning a retinal image includes providing an infrared light source, emitting infrared radiation from the infrared light source toward a beam splitter, reflecting the infrared radiation with the beam splitter through a focusing lens, focusing the infrared radiation with the focusing lens on a retina, collecting radiation reflected by the retina through the beam splitter at a camera, producing an image signal representative of a plurality of images of the retina with the camera based on the collected radiation, selecting one of the plurality of images of the retina for display from the image signal, displaying the selected image of the retina on a display, comparing the selected image of the retina to at least one of a plurality of images of retinas stored in a database, selecting one of the plurality of images of retinas stored in the database that matches the selected image of the retina, and displaying the one of the matching image of the retina on the display along with the selected image of the retina.

The above-described embodiments of the present invention are intended as examples, and all embodiments of the present invention are not limited to including the features described above.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

It would be advantageous if infrared light could be used to perform a retinal scan to obtain an image of the retina.

It would be advantageous if an observer were allowed to see direct video images of the retina while performing an examination.

It would be advantageous if a retinal scan of the retina could be performed without dilation of the retina.

It would be advantageous if digital image enlargement (Zoom) were allowed during the active examination.

It would be advantageous if a specific tissue could be enhanced digitally for easier identification.

It would be advantageous if a soft cuff stabilized the retinal scanner on the subject face, over the eye. It would be further advantageous if the soft cuff blocked any visible light from the eye so that the pupil would dilate naturally.

It would be advantageous if the retinal scanner were connected to a government or law enforcement database, such as the FBI record system, for documentation of the examination.

If the proper eye distance is not maintained while the user attempts to look into the lens of the retinal scanning device, it may be difficult for a high quality scan to be captured. In order for a high quality scan to be captured, the user may need to focus his or her eye at an extremely close range to the lens. It would be advantageous if a good quality scan could be captured as far as three feet away from the lens of the scanning device to the retina of the user.

It would be advantageous if a wider image of the retinal vessels could be captured than with conventional retinal scanners. It would be further advantageous if the wider image contained more data points than a conventional retinal scan, reducing false positives and negatives.

In one embodiment, a retinal scanner employs an infrared light source to illuminate the retina instead of visible light. In one embodiment, the retinal scanner may be a video infrared retinal image scanner (VIRIS). The retinal scanner may have an inflatable cup shaped sleeve that rests on the forehead and cheek to completely cover the orbit surrounding the eye. This keeps the retinal scanner in a stable position close to the eye to limit any movement between the retinal scanner and the eye to be scanned. The inflatable cup also blocks out substantially all of the visible light, allowing the pupil to dilate naturally to get a better view inside the eye.

The examination with the retinal scanner can be performed in a room with normal lighting. The inflatable sleeve is disposable to prevent contamination between scans. Infrared light is directed into the naturally dilated pupil and focused with the aid of lenses mounted on a wheel ("wheel of lenses") that can be rotated in front of the camera lens to focus the image or focused automatically with an auto focus lens mounted in front of the CCD camera.

A camera, such as a black and white CCD camera, a complementary metal oxide semiconductor-based camera, or a high-resolution camera, may be used to capture the image. In one embodiment, visible light may be used as a light source, and then a color CCD camera captures the image. A plurality of images captured by the camera makes up a video signal. The video signal is then sent to a liquid crystal display screen, such as a high-resolution LCD screen, that the observer can use to view the images of the retinal vessels. Depressing the "still image capture switch" then captures a still image.

Once a segment of video is captured, a thumb wheel can be used to "scroll" up and down through sequential images near the "captured" image to isolate the best image for analysis. The segments of video may comprise, for example, individual frames, or images. Once this image is identified it is sent to the laptop using a Video Transmitter. The image is processed in the laptop computer to establish the data points to be registered. This image can then be sent to the FBI database for comparison to previous scans or to initiate a new file specific to that person.

More specifically, the VIRIS is composed of multiple functions. The first function is producing light to view into the eye. This may be done with an infrared light emitting diode (LED) (800-950 nm) that receives power from a direct power supply or from a Lithium Ion battery power supply. The amperage is varied through a dimmer circuit using variable resistors to vary the light output of the LED. The LED light is focused through an adjustable positive or negative diopter focusing lens to focus the light onto the retina inside the eye. An auto focus lens can also be used.

In one embodiment, a direct image is captured by a black-and-white (BW) charge coupled device (CCD) camera collecting infrared (IR) light. In another embodiment the direct images captured by a color CCD camera collecting visible light. In another embodiment, the camera may be a complementary metal oxide semiconductor (CMOS)-based device. The video image is converted from an analog signal to a digital signal by the Streaming Video Converter, which may be embodied in software. If a digital CCD camera is used no digital converter is needed. The digital signal is then sent to a BW to Color Converter to convert the black/white image to color. In one embodiment, the conversion of a black/white image to a color image is done using a computer code imbedded on a high-speed computer processor in the unit.

In one embodiment, a digital zoom is adjusted using a zoom in/out switch on the side of the VIRIS. This image is then displayed on a high resolution liquid crystal display (LCD) screen, such as a high-resolution (Hi-Res) LCD screen on the back of the VIRIS to aid the examiner in obtaining a good scan. Once an image is selected (captured) the images sequential to the captured image can be viewed by scrolling through them on a time line using a thumb wheel and viewing them on the LCD screen. The best image is selected and then transmitted to the Laptop computer using a wired or wireless Video Transmitter.

Another aspect is image processing on a computer. The Video Transmitter sends the selected still image to a Laptop or computer. Software on the laptop then manipulates the raw image; adjusts the contrast, white balance, black balance, color saturation and brightness. Software can also be used to digitally enhance the retinal vessels with an artificial color to enhance visualization. Images from the scan can be measured and compared on sequential examination visits. All of these images may be, for example, DICOM standard and/or MPEG4 standard images. Images and files produced will interface with the FBI database software system (SSL Certified) to allow downloads of the data. Connections to the network can be wireless (using WPA) or wired.

Figure 1:
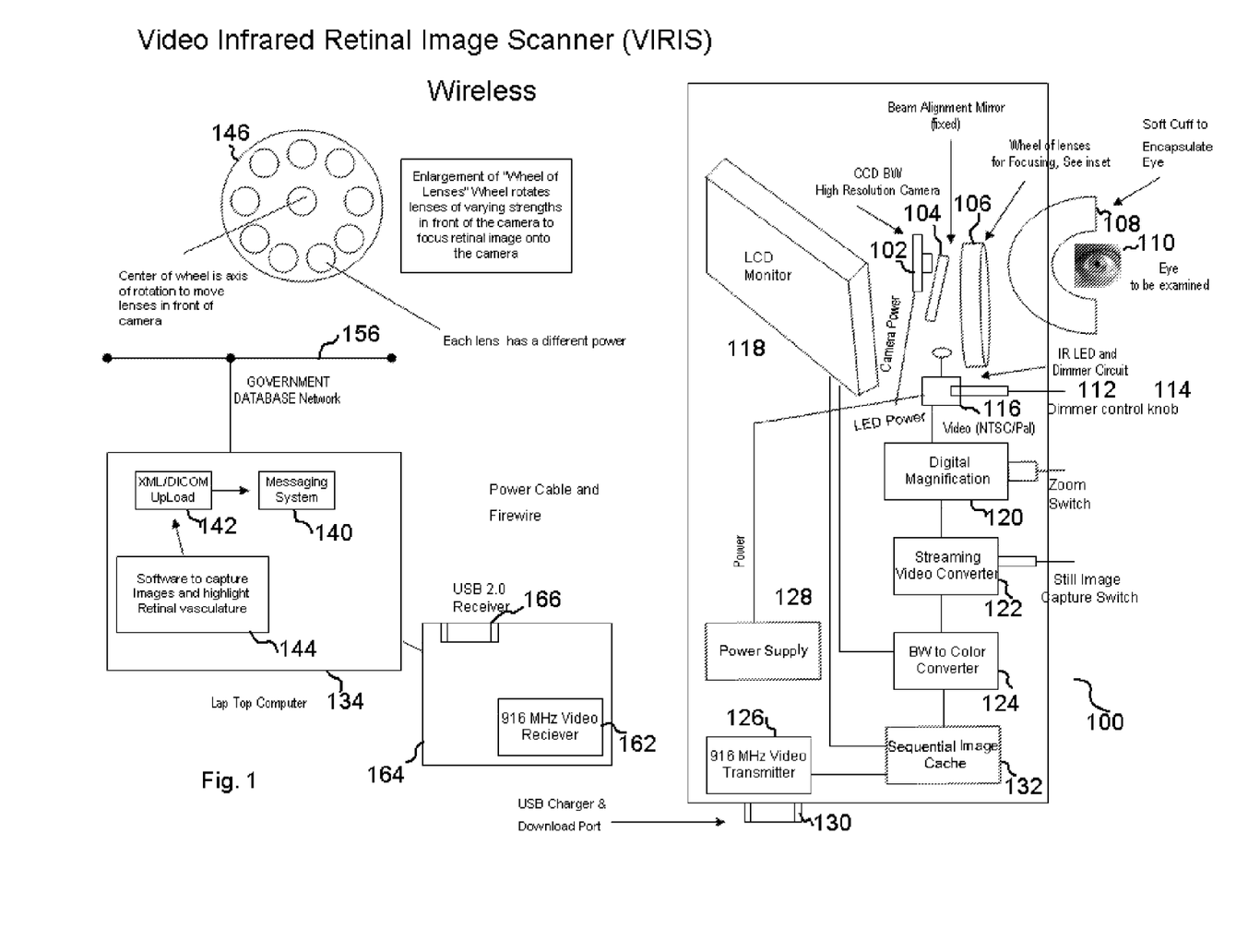
FIG. 1 shows a wireless video infrared retinal image scanner according to an embodiment of the invention.

In FIG. 1 is shown a wireless video infrared retinal image scanner 100 according to an embodiment of the invention. The video infrared retinal image scanner 100 may be used by an examiner to visualize and record the retina of the eye. The video infrared retinal image scanner 100 is held in front of the examiner's eye by a handle, and then moved forward toward the subject's eye until the visible light is adjusted to visualize inside the subject's eye.

The video infrared retinal image scanner 100 has a light source 116, which may be an infrared light source, such as a light emitting diode (LED). In another embodiment, the light source is a visible light source. In other embodiments, the light source 116 may be an electric lamp, a mercury vapor lamp, a halogen lamp, or a tungsten filament lamp. The light source 116 may be equipped with a filter to filter out visible wavelengths and pass infrared wavelengths of radiation. The light source 116 has a dimmer switch 112. The light source 116 may be powered by a power supply 128. The power supply 128 may be a battery, such as a rechargeable lithium ion battery, a nickel cadmium battery, or an alkaline battery.

The light source 116 emits radiation in the range of 800-950 nm, and particularly, at about 945 nm. The dimmer switch 112 controls the intensity of the infrared radiation emitted by the light source 116, such as by a rheostat, or an amplifier. The dimmer circuit may be controlled by a dimmer control knob 114. The examiner may manipulate the dimmer control knob 114 during the examination to increase or reduce the amount of infrared radiation shed on the patient's eye.

In one embodiment, the light source 116 is a light emitting diode. Since light emitting diodes are current devices, the degree to which they illuminate is proportional to the amount of electric current flowing through the light emitting diode, rather than to the voltage drop across the light emitting diode. Consequently, a power supply that varies voltage across the light source 116 may not be efficient or linear when trying to control the intensity of radiation emitted from light source 116. In one embodiment, the intensity of radiation produced by the light source 116 is controlled by supplying a pulsed width square wave to turn the light source 116 on and off very rapidly. Since a light emitting diode has a very fast turn on time, typically measured in nano-seconds, the intensity of radiation emitted from the light source 116 can be varied by varying the width of the pulses supplied to the light source 116.

Radiation from the infrared light emitting diode 116 may be focused through a lens 106 toward the eye to be examined 110. In one embodiment, the lens 106 may be an adjustable positive or negative diopter focusing lens. The lens 106 may be one of a plurality of lens in a wheel of focusing lenses 146 of varying powers. The wheel of focusing lenses 146 may be rotated to select the proper lens for examination.

The video infrared retinal image scanner 100 may be equipped with a soft cuff 108 to encapsulate the eye to be examined 110. The soft cuff 108 may be disposable to prevent contamination between subjects. In one embodiment, the soft cuff 108 rests on the forehead and cheek to completely cover the orbit surrounding the eye, and keep ambient, or background light from interfering with the examination. The radiation from the infrared light emitting diode 116 through the lens 106 also passes through the soft cuff 108 to reach the eye to be examined 110. In one embodiment, the soft cuff 108 may be inflatable. The soft cuff 108 keeps the video infrared retinal image scanner 100 in a stable position close to the eye to be examined 110, and limits movement between the video infrared retinal image scanner 100 and the eye to be examined 110, without the need for the observer to be close to the subject. The soft cuff 108 also allows the pupil to dilate naturally, to afford a better view inside the eye, by blocking out substantially all of the surrounding light. Consequently, in one embodiment, an examination of the eye using the video infrared retinal image scanner 100 can be performed in a room with normal lighting.

In another embodiment, the video infrared retinal image scanner 100 is held at a distance from the eye to be examined. In this embodiment, an examination of the eye using the video infrared retinal image scanner 100 may be performed in a darkened room. The darkened room may let the eye dilate naturally. In one embodiment, the video infrared retinal image scanner 100 is held at a distance of about 3 to 6 inches from the eye to be examined. In another embodiment, the video infrared retinal image scanner 100 is held at a distance of about 6 inches to 1 foot from the eye to be examined. In yet another embodiment, the video infrared retinal image scanner 100 is held at a distance of up to 3 feet from the eye to be examined.

Radiation reflected by the eye to be examined 110 returns through the lens 106 and through the beam splitter 104 and is collected by a camera 102, such as a high-resolution camera 102. In this embodiment, the radiation passes through the beam splitter 104. In one embodiment, the beam splitter 104 may be fixed in place. In one embodiment, the radiation returns through an aperture in the soft cuff 108.

In one embodiment, the camera 102 is a charge coupled device. In another embodiment, the camera 102 is a complementary metal-oxide-semiconductor (CMOS) based device, or an array of light emitting diodes running in reverse, i.e., collecting light and converting it into an electrical signal. The camera 102 may be a black-and-white camera. The camera 102 is powered by the power supply 128 as well.

An autofocus lens may be mounted in front of the camera 102 to focus the light returning from the eye to be examined 110. In another embodiment, visible light is used to examine the eye, and in that case, the image may be captured by a color camera.

The camera 102 captures an image of the retina to be examined 110 formed by the infrared radiation. A video signal formed by the camera 102 of the image of the retina to be examined 110 is converted from an analog signal to a digital signal by a streaming video converter 122. In the event that the camera 102 is a digital camera, such as a digital charge coupled device, then no converter is needed. The image of the retina may also be magnified in a magnifier 120, such as a digital magnifier 120 after the image signal is converted to a digital signal.

Next, the signal may be converted from black-and-white, or grayscale, to color in a black-and-white to color converter 124. In one embodiment, the black-and-white to color converter 124 maps intensities of pixels of a charge coupled device to separate colors. Mapping the intensities of the pixels to colors may include interpolating pixel intensities between two (or more) pixels, or extrapolating pixel intensities around edges.

In one embodiment, the black-and-white to color converter 124 creates a map of grey scale to color that is appropriate for the pattern of blood vessels in the retina. In this embodiment, the black-and-white to color converter 124 may normalize the black-and-white image of the eye. The image of the eye may be normalized with a histogram normalizer. Normalizing the image of the eye produces a uniform intensity profile of the image. The black-and-white to color converter 124 may also use edge detection image processing to identify the blood vessels and other structures of the eye. Finally, after the image of the eye has been mapped, direct spatial domain intensity transformations are applied to each structure of the eye, resulting in a colorized image of the eye.

The image signal is then sent to a screen 118 to display the image for the observer, so that the observer may view the images from inside the subject's eye. In one embodiment, the image is manipulated so that it is right side up and frontwards when it is presented to the examiner. In one embodiment, the screen 118 may be a high-resolution liquid crystal display screen. In another embodiment, the screen 118 may be an array of light emitting diodes or a plasma display screen. A lens, such as a high of plus or positive diopter lens may be mounted over the screen 118. Such a lens mounted over the screen 118 may magnify the image and limit the accommodation necessary to focus on the screen 118.

The image signal from the streaming video converter 122 may also be sent to a video transmitter 126, which transmits the image over a wireless connection to a laptop computer 134 for documentation and storage. In one embodiment, the video transmitter 126 transmits the image signal to a video receiver 162 coupled to the laptop computer 134. In one embodiment, the video transmitter 126 transmits in the range of 800-1000 MHz, such as at 916 MHz.

In one embodiment, the video transmitter 126 sends a raw digital video signal to a laptop computer 134. In this embodiment, the laptop computer 134 has a separate black-and-white to color converter 136, as well as a real-time video capture 138. The real-time video capture 138 captures the video signal in real time, and sends it to the black-and-white to color converter 136. Software 144 on the laptop may be used to manipulate the image signal by capturing the raw image, adjusting the contrast, white balance, black balance, color saturation, or brightness. Separate images of the eye can be "stitched" together to form a montage. A three-dimensional image can be developed from the images as well. A three-dimensional image can be rotated or manipulated, such as translated in the X, Y, or Z axes. Cross-sectional images can be produced from the separate images as well. In one embodiment, a three-dimensional effect is produced by displaying images taken closely together in time, but from slightly different points of view due to, for example, movement of the camera during examination.

Images of retinas can be measured and compared to images stored in a database. In one embodiment, the images conform to the XML, JPEG or DICOM standards. In another embodiment; the images conform to an MPEG-4 standard. Images and files produced by the video infrared retinal image scanner 100 may be able to interface with any government or law enforcement record software system. Downloads of the images and associated data over a network to the government or law enforcement record system may be allowed. Connections to the network can be wireless or wired. Remote access to the images on the laptop may be allowed by software.

Figure 2:
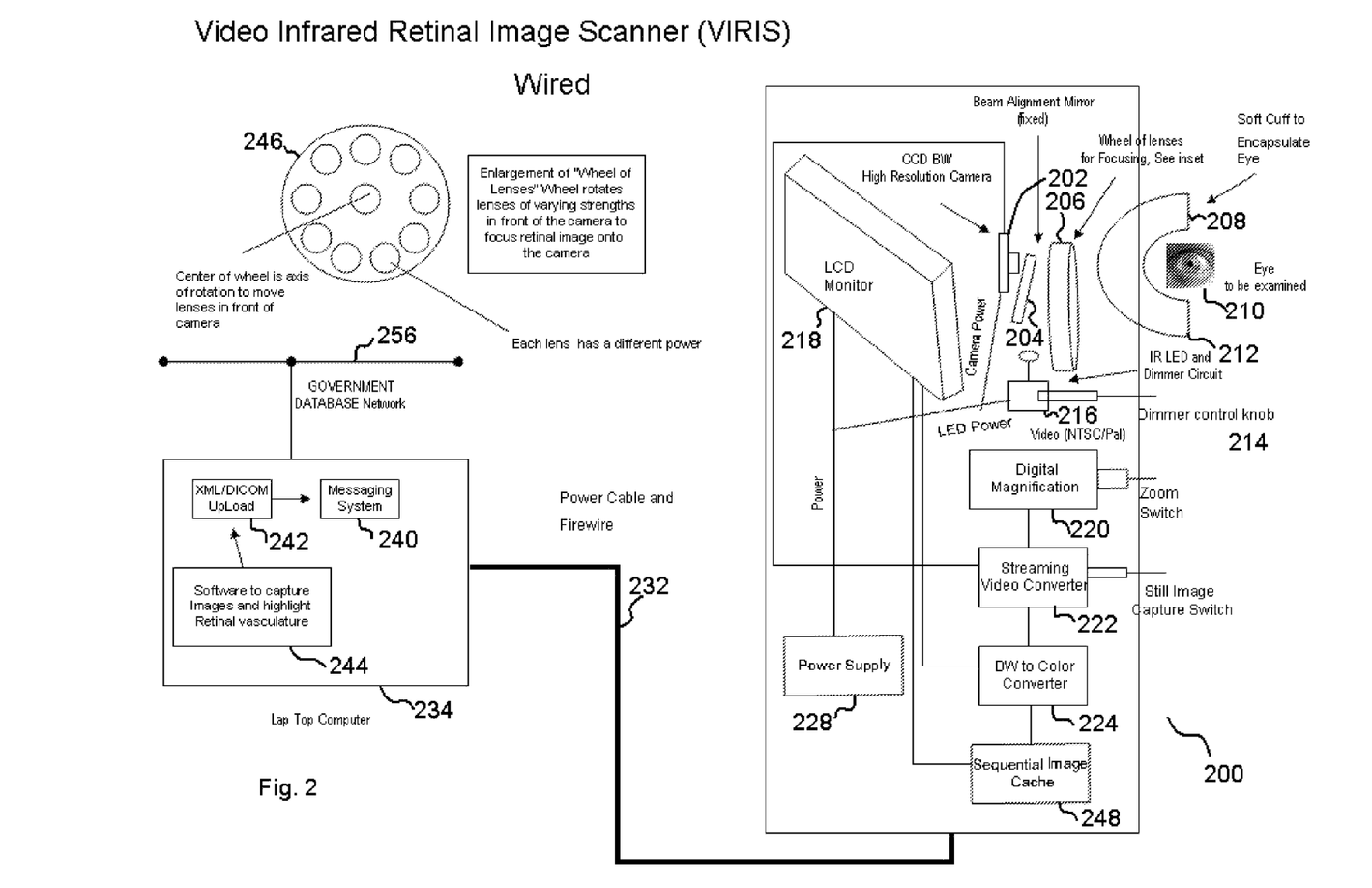
FIG. 2 shows a wired video infrared retinal image scanner according to an embodiment of the invention.

In FIG. 2 is shown a wired video infrared retinal image scanner 200 according to an embodiment of the invention. The video infrared retinal image scanner 200 may be used by an examiner to visualize and record the retina of the eye. The video infrared retinal image scanner 200 is placed in front of the examiner's eye, and then moved forward toward the subject's eye until the visible light is adjusted to visualize inside the subject's eye.

The video infrared retinal image scanner 200 has a light source 216, which may be an infrared light source, such as a light emitting diode (LED). In another embodiment, the light source is a visible light source. In other embodiments, the light source 216 may be an electric lamp, a mercury vapor lamp, a halogen lamp, or a tungsten filament lamp. The light source 216 may be equipped with a filter to filter out visible wavelengths and pass infrared wavelengths of radiation. The light source 216 has a dimmer switch 212. The light source 216 may be powered by a power supply 228. The power supply 228 may be a battery, such as a rechargeable lithium ion battery, a nickel cadmium battery, or an alkaline battery.

The light source 216 emits radiation in the range of 800-950 nm, and particularly, at about 945 nm. The dimmer switch 212 controls the intensity of the infrared radiation emitted by the light source 216, such as by a rheostat, or an amplifier. The dimmer circuit may be controlled by a dimmer control knob 214. The examiner may manipulate the dimmer control knob 214 during the examination to increase or reduce the amount of infrared radiation shed on the patient's eye.

In one embodiment, the light source 216 is a light emitting diode. Since light emitting diodes are current devices, the degree to which they illuminate is proportional to the amount of electric current flowing through the light emitting diode, rather than to the voltage drop across the light emitting diode. Consequently, a power supply that varies voltage across the light source 216 may not be efficient or linear when trying to control the intensity of radiation emitted from light source 216. In one embodiment, the intensity of radiation produced by the light source 216 is controlled by supplying a pulsed width square wave to turn the light source 216 on and off very rapidly. Since a light emitting diode has a very fast turn on time, typically measured in nano-seconds, the intensity of radiation emitted from the light source 216 can be varied by varying the width of the pulses supplied to the light source 216.

Radiation from the infrared light emitting diode 212 may be focused through a lens 206 toward the eye to be examined 210. In one embodiment, the lens 206 may be an adjustable positive or negative diopter focusing lens. The lens 206 may be one of a plurality of lens in a wheel of focusing lenses 246 of varying powers. The wheel of focusing lenses 246 may be rotated to select the proper lens for examination.

The video infrared retinal image scanner 200 may be equipped with a soft cuff 208 to encapsulate the eye to be examined 210. The soft cuff 208 may be disposable to prevent contamination between subjects. The soft cuff 208 rests on the forehead and cheek to completely cover the orbit surrounding the eye, and keep ambient, or background light from interfering with the examination. The radiation from the infrared light emitting diode 212 through the lens 206 also passes through the soft cuff 208 to reach the eye to be examined 210. In one embodiment, the soft cuff 208 may be inflatable. The soft cuff 208 keeps the video infrared retinal image scanner 200 in a stable position close to the eye to be examined 210, and limits movement between the video infrared retinal image scanner 200 and the eye to be examined 210, without the need for the observer to be close to the subject. The soft cuff 208 also allows the pupil to dilate naturally, to afford a better view inside the eye, by blocking out substantially all of the surrounding light. Consequently, in one embodiment, an examination of the eye using the video infrared retinal image scanner 200 can be performed in a room with normal lighting.

In another embodiment, the video infrared retinal image scanner 200 is held at a distance from the eye to be examined. In this embodiment, an examination of the eye using the video infrared retinal image scanner 200 may be performed in a darkened room. The darkened room may let the eye dilate naturally. In one embodiment, the video infrared retinal image scanner 200 is held at a distance of about 3 to 6 inches from the eye to be examined. In another embodiment, the video infrared retinal image scanner 200 is held at a distance of about 6 inches to 2 foot from the eye to be examined. In yet another embodiment, the video infrared retinal image scanner 200 is held at a distance of up to 3 feet from the eye to be examined.

Radiation reflected by the eye to be examined 210 returns through the lens 206 and through the beam splitter 204 and is collected by a camera 202, such as a high-resolution camera 202. In this embodiment, the radiation passes through the beam splitter 204. In one embodiment, the beam splitter 204 may be fixed in place. In one embodiment, the radiation returns through an aperture in the soft cuff 208.

In one embodiment, the camera 202 is a charge coupled device. In another embodiment, the camera 202 is a complementary metal-oxide-semiconductor (CMOS) based device, or an array of light emitting diodes running in reverse, i.e., collecting light and converting it into an electrical signal. The camera 202 may be a black-and-white camera. The camera 202 is powered by the power supply 228 as well.

The camera 202 may be a black-and-white camera. In another embodiment, visible light is used to examine the eye, and in that case, the image may be captured by a color camera. An autofocus lens may be mounted in front of the camera 202 to focus the light returning from the eye to be examined 210.

The camera 202 captures an image of the retina to be examined 210 formed by the infrared radiation. A video signal formed by the camera 202 of the image of the retina to be examined 210 is converted from an analog signal to a digital signal by a streaming video converter 222. In the event that the camera 202 is a digital camera, such as a digital charge coupled device, then no converter is needed. The image of the retina may also be magnified in a magnifier 220, such as a digital magnifier 220 after the image signal is converted to a digital signal. Next, the image signal may be converted from black-and-white to color in a black-and-white to color converter 224. The black-and-white to color 224 may work in a manner similar to that of the black-and-white to color converter 104 shown in FIG. 1. That is, wavelength components in the infrared range may be scaled by a predetermined amount so that wavelengths in the visible range are mapped instead.

The image signal is then sent to a screen 218 to display the image for the observer, so that the observer may view the images from inside the subject's eye. In one embodiment, the screen 218 may be a high-resolution liquid crystal display screen. In another embodiment, the screen 218 may be an array of light emitting diodes or a plasma display screen. In one embodiment, the image is manipulated so that it is right side up and frontwards when it is presented to the examiner. A lens, such as a high of plus or positive diopter lens may be mounted over the screen 218. Such a lens mounted over the screen 218 may magnify the image and limit the accommodation necessary to focus on the screen 218.

The image signal from the streaming video converter 222 may also be sent over a wired connection 232 to a lap top computer 234 for documentation and storage. In one embodiment, the connection 232 is a Universal Serial Bus. In one embodiment, a raw digital video signal is sent to the laptop computer 234. In this embodiment, the laptop computer 234 has a separate black-and-white to color converter 236, as well as a real-time video capture 238. The real-time video capture 238 captures the video signal in real time, and sends it to the black-and-white to color converter 236. Software 244 on the laptop may be used to manipulate the image signal by capturing the raw image, adjusting the contrast, white balance, black balance, color saturation, or brightness. Separate images of the eye can be "stitched" together to form a montage. A three-dimensional image can be developed from the images as well. A three-dimensional image can be rotated or manipulated, such as translated in the X, Y, or Z axes. Cross-sectional images can be produced from the separate images as well. In one embodiment, a three-dimensional effect is produced by displaying images taken closely together in time, but from slightly different points of view due to, for example, movement of the camera during examination.

Images of retinas can be measured and compared to images stored in a database. In one embodiment, the images conform to the JPEG or DICOM standards. In another embodiment, the images conform to an MPEG-4 standard. Images and files produced by the video infrared retinal image scanner 200 may be able to interface with any government or law enforcement record software system. Downloads of the images and associated data over a network to the government or law enforcement record system may be allowed. Connections to the network can be wireless or wired. Remote access to the images on the laptop may be allowed by software.

In one embodiment, images taken by the infrared retinal image scanner 200 may be stored on an internal memory chip, such as a SD card 226. In one embodiment, the infrared retinal image scanner 200 may be rechargeable over a universal serial bus (USB) connection 230, or over a network.

Figure 3:
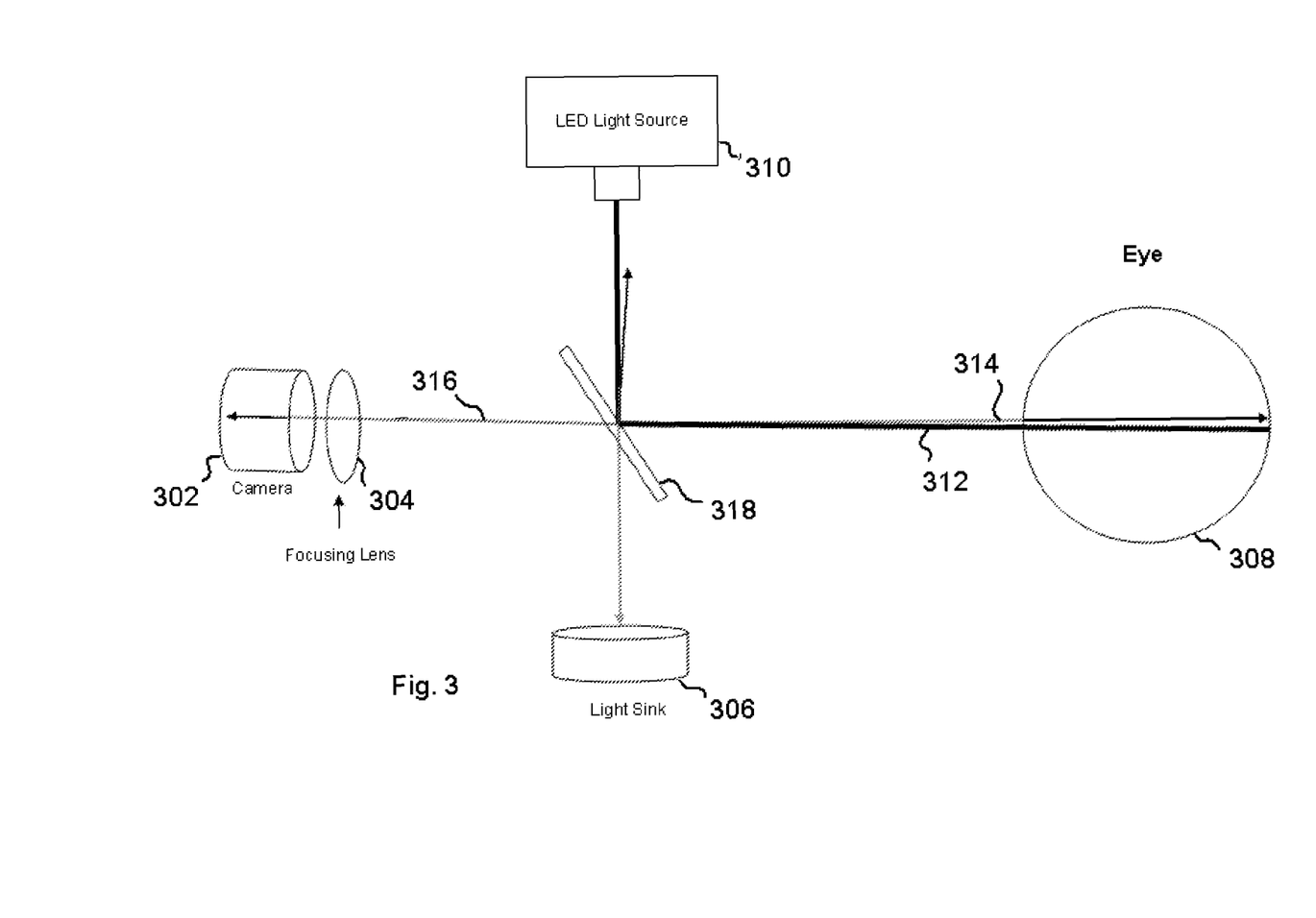
FIG. 3 shows a ray diagram for use with an infrared retinal image scanner.

In FIG. 3 is shown a ray diagram for use with an infrared retinal image scanner. As may be seen in FIG. 3, infrared radiation emanating from an LED light source 310 is redirected by a beam splitter 318 toward an eye 308. The redirected beam is enumerated 314. The redirected beam of infrared radiation 314 reaches the eye 308 and is reflected off the eye 308 as beam 312. Beam 312 passes through the beam splitter 318 again as beam 316, and also passes through a focusing lens 304 before reaching a camera 302. Some of the infrared radiation from LED light source 310 passes through the beam splitter 318 and reaches light sink 306.

Figure 4:
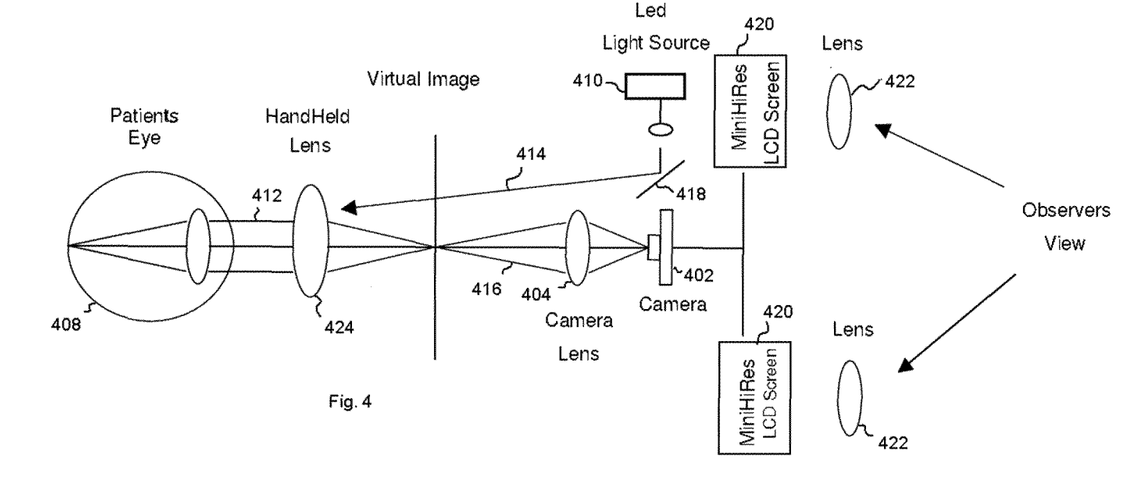
FIG. 4 shows a ray diagram for use with an infrared retinal image scanner.

In FIG. 4 is shown a ray diagram for use with an infrared retinal image scanner. As may be seen in FIG. 4, infrared radiation emanating from of a light source 410 is redirected by a beam splitter 418 toward an eye 408. The redirected beam is enumerated 414. The redirected beam 414 may or may not pass through a handheld lens 424 held in front of the eyes 408 by the examiner. The redirected beam 414 reaches the eye 408 and is reflected off of the eye 408 as beam 412, toward the handheld lens 424. The handheld lens 424 is used by the examiner to focus the light on the eye 408 and eight in the examination. Beam 412 passes through the handheld lens 424 as beam 416 and is focused on a camera lens 404. A virtual image of the retina 408 is formed between the handheld lens 424 and the camera lens 404. The beam 416 passes through the camera lens 404 and is collected by a camera 402. A signal from the camera 402 is distributed to two display screen 420, in front of which may be placed lenses 422. Images of the eye 408 are displayed on the screens 422 and viewed by the examiner.

Figure 5:
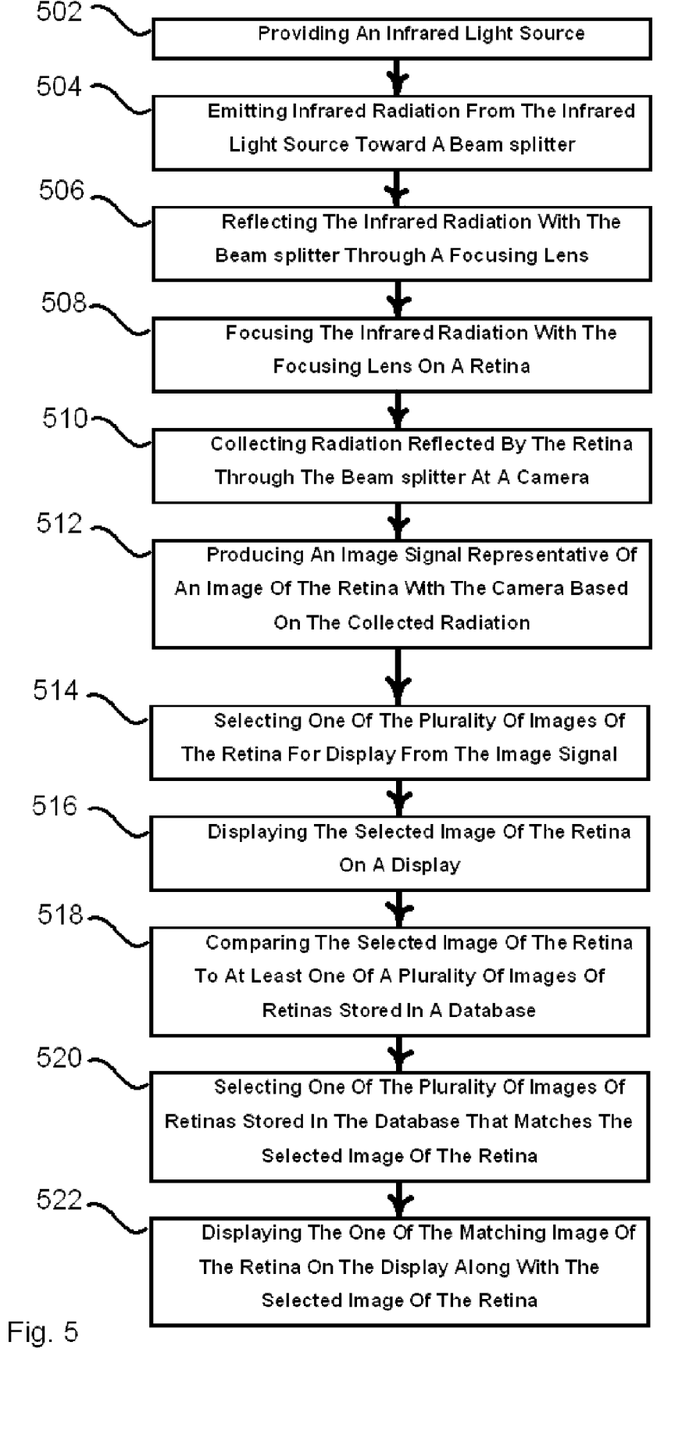
FIG. 5 shows a process of retinal scanning according to an embodiment of the invention.

In FIG. 5 is shown a process of retinal scanning according to an embodiment of the invention. In a first operation 502 an infrared light source is provided. After that, the process moves to operation 504, in which infrared radiation is emitted from the infrared light source toward a beam splitter. After that, the process moves to operation 506, in which the infrared radiation is reflected by the beam splitter through a focusing lens. After that, the process moves to operation 508, in which the infrared radiation is focused by the focusing lens on a retina. After that, the process moves to operation 510, in which radiation reflected by the retina through the beam splitter is collected by a camera. After that, the process moves to operation 512, in which an image signal representative of an image of the retina is produced by the camera based on the collected radiation. After that, the process moves to operation 514, in which one of the plurality of images of the retina is selected from the image signal for display. After that, the process moves to operation 516, in which the selected image of the retina is displayed on a display. After that, the process moves to operation 518, in which the selected image of the retina is compared to at least one of a plurality of images of retinas stored in a database. After that, the process moves to operation 520, in which one of the plurality of images of retinas stored in the database that matches the selected image of the retina is selected. After that, the process moves to operation 522, in which the matching image of the retina is displayed on the display along with the selected image of the retina.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A retinal image scanner, comprising:
an infrared light source,
a beam splitter reflecting infrared radiation from the light source through one of a plurality of focusing lenses to a retina,
a camera collecting radiation reflected by the retina through the beam splitter,
an analog to digital convertor receiving a raw signal from the camera based on the collected radiation, the analog to digital convertor converting the raw signal to a digital signal,
a streaming video converter processing the digital signal into a video signal, and a video monitor displaying an image of the retina based on the video signal;
the retinal image scanner further comprising a video transmitter, the video transmitter transmitting the video signal to a computer over a network, the computer extracting a plurality of images from the video signal;
a comparator comparing at least one of the plurality of images with at least one of a plurality of stored images;
a selector selecting one of the plurality of stored images that matches the one of the plurality of images; and
the computer having:
a real-time video capture capturing images from the video signal, a black-and-white to color converter adapted for processing images of the retina for converting the images to color, 3-D rendering software adapted for processing images of the retina, and a messaging system.

2. The retinal scanner of claim 1 wherein the black-and-white to color converter and 3-d rendering software are adapted to highlight blood vessels and structures.

3. A retinal image scanner comprising:
an infrared light source,
a beam splitter reflecting infrared radiation from the light source through one of a plurality of focusing lenses to a retina,
a camera collecting radiation reflected by the retina through the beam splitter,
an analog to digital convertor receiving a raw signal from the camera based on the collected radiation, the analog to digital convertor converting the raw signal to a digital signal,
a streaming video converter processing the digital signal into a video signal, and a video monitor displaying an image of the retina based on the video signal;
the retinal image scanner further comprising a video transmitter, the video transmitter transmitting the video signal to a computer over a network, the computer extracting a plurality of images from the video signal;
a comparator comparing at least one of the plurality of images with at least one of a plurality of stored images;
a selector selecting one of the plurality of stored images that matches the one of the plurality of images; and
a black and white to color converter adapted for processing images of the retina for scaling a plurality of wavelengths of the digital signal into a color signal, wherein the streaming video converter processes the color signal into the video signal.

4. The retinal scanner of claim 3 wherein the black-and-white to color converter is adapted to highlight blood vessels.

5. A method of scanning a retinal image, comprising:
providing an infrared light source;
emitting infrared radiation from the infrared light source toward a beam splitter;
reflecting the infrared radiation with the beam splitter through a focusing lens;
focusing the infrared radiation with the focusing lens on a retina;
collecting radiation reflected by the retina through the beam splitter at a camera;
producing an image signal representative of a plurality of images of the retina with the camera based on the collected radiation;
selecting one of the plurality of images of the retina for display from the image signal;
displaying the selected image of the retina on a display;
comparing the selected image of the retina to at least one of a plurality of images of retinas stored in a database;
selecting one of the plurality of images of retinas stored in the database that matches the selected image of the retina;
displaying the one of the matching image of the retina on the display along with the selected image of the retina; and
converting the image signal into a color signal highlighting blood vessels; and displaying a plurality of color images of the retina on the display.

6. The method of scanning a retinal image of claim 5, further comprising holding the infrared light source at a distance of 3 to 6 inches from the retina.

7. The method of scanning a retinal image of claim 5, further comprising holding the infrared light source at a distance of 6 inches to 1 foot from the retina.

8. The method of scanning a retinal image of claim 5, further comprising holding the infrared light source at a distance of up to 3 feet from the retina.

* * * * *